United States Patent [19]

Sekmakas et al.

[11] 4,263,192

[45] * Apr. 21, 1981

[54] COPOLYMERIZATION IN WATER SOLUBLE POLYOL WITH CONTROLLED REACTION WITH THE POLYOL AND AQUEOUS COATINGS CONTAINING THE RESULTING COPOLYMER SOLUTION

[75] Inventors: Kazys Sekmakas, Palatine; Raj Shah, Schaumburg, both of Ill.

[73] Assignee: DeSoto, Inc., Des Plaines, Ill.

[*] Notice: The portion of the term of this patent subsequent to Mar. 11, 1997, has been disclaimed.

[21] Appl. No.: 42,890

[22] Filed: May 29, 1979

Related U.S. Application Data

[62] Division of Ser. No. 910,368, May 30, 1978, Pat. No. 4,193,904.

[51] Int. Cl.$^3$ ............................................... C08K 5/05
[52] U.S. Cl. ................................................. 260/29.6 E
[58] Field of Search ....................... 260/29.6 H, 29.6 E

[56] References Cited

U.S. PATENT DOCUMENTS

| | | | |
|---|---|---|---|
| 3,804,790 | 4/1974 | Sekmakas | 260/33.4 R |
| 4,193,904 | 3/1980 | Sekmakas | 260/29.6 H |

*Primary Examiner*—Paul R. Michl
*Attorney, Agent, or Firm*—Dressler, Goldsmith, Shore, Sutker & Milnamow, Ltd.

[57] ABSTRACT

Methods are disclosed for the production of a water dispersible solution of acidic copolymer in water soluble polyol with controlled limited reaction between the copolymer and the polyol. This method comprises copolymerizing monoethylenically unsaturated monomers including a proportion of carboxyl-functional monomer providing dispersibility in water with the aid of a base and from 0.5%–5%, based on the total weight of monomers, of a monoethylenically unsaturated monomer carrying a reactive group selected from dicarboxylic acid anhydride functionality and N-methylol functionality, the copolymerization being carried out in solution in a water soluble polyol. This copolymerization is preceded by or carried out under conditions causing substantially complete reaction between the anhydride or the N-methylol functionality in the reactive monomer, and the hydroxy groups in the polyol. Aqueous coating compositions are provided by dispersing the copolymer solution in water with the aid of a volatile base.

4 Claims, No Drawings

COPOLYMERIZATION IN WATER SOLUBLE POLYOL WITH CONTROLLED REACTION WITH THE POLYOL AND AQUEOUS COATINGS CONTAINING THE RESULTING COPOLYMER SOLUTION

This is a division of application Ser. No. 910,368, filed May 30, 1978, now U.S. Pat. No. 4,193,904.

The present invention relates to aqueous coating compositions containing very little, if any, volatile organic solvent in order to provide greater hardness and improved water resistance.

It is well known to copolymerize monoethylenic monomers, including carboxyl-functional monomers, in volatile water-miscible organic solvent solution to produce acidic copolymers which can be dispersed in water with the aid of a base. The removal of the organic solvent is not practicable, so it carries over into the aqueous dispersion. When this dispersion is coated on a substrate and baked, the solvent evaporates. The result is unnecessary expense, the hazard of fire, and undesired pollution. The proportion of solvent is normally at least 50% of the weight of the copolymer and it is desired to reduce this to not more than about 20%, and preferably to eliminate volatile solvent entirely.

One way to eliminate the organic solvent is to copolymerize the monoethylenic monomers in solution in a polyol being careful to avoid any reaction between the monomers and the polyol. This is shown in Hicks U.S. Pat. No. 3,352,806. Various polyols can be used, but particularly good results have been obtained using bisphenol-based diols, especially those in which the bisphenol is adducted with ethylene oxide to produce a water soluble adduct as described in Blank U.S. Pat. No. 3,960,983. Of course, since ultimate dispersion in water is intended, the polyol must be water soluble as disclosed in the said patent to Hicks.

The difficulty with the prior technology is that the polymerization takes place in solution in the polyol which yields relatively low molecular weight copolymers. As a result, in the absence of extensive cross-linking with the aminoplast or pheno-plast curing agent, the cured coatings are not as hard as desired. With more curing agent to obtain more extensive cross-linking and greater hardness, then brittleness becomes a factor. In either event, superior water resistance as is needed to maintain adhesion and resist "blushing" on elevated temperature steam treatment (as encountered in pasteurization) is hard to achieve.

These problems are illustrated in the coating of beer can exteriors which are being developed to provide a pigmented gloss coating which can be printed and used without overcoating. In the absence of this invention it was discovered that the hardness and water resistance properties of white-pigmented coatings applied to the exterior of beer cans was marginal. Thus, a pencil hardness of 1H was obtained, and this is not quite adequate to withstand the scrapes and impacts encountered when the cans are handled in high speed can-handling equipment. At the same time, the beer pasteurization schedule induces some separation of the coatings from the cans and some limited "blushing" in which the desired gloss is lost.

In this invention a reactive monoethylenic monomer is used in a controlled small amount and the copolymerization in solution in the water soluble polyol is conducted under conditions which deliberately cause substantially complete reaction with the reactive monomer, or such reaction is caused to precede copolymerization. This creates a controlled reaction with the excess polyol which is limited by the proportion of reactive monomer so as to effectively increase the molecular weight of the copolymer by tieing copolymer fragments together through the water soluble polyol. The result is a higher molecular weight carboxyl-functional copolymer and the starting polyol is modified by reaction with the reactive monomer. The complex product which results is still dispersible in water, albeit at a small loss in solids content and flow, but the product cures to provide flexible coatings of greater hardness (typically 3H) and improved water resistance.

It is thought that the incorporation of polyol in the growing copolymer chain not only increases molecular weight, but it creates branching and improves compatibility with the unreacted diol. A complex result must occur because the final characteristics of the cured coatings are so significantly alterred and also because the copolymer solution is so greatly changed (in typical operation its viscosity is doubled by the presence of only 2% of the reactive monomer as will be specifically illustrated).

The flow characteristics are of secondary significance since these can be modified by increasing the proportion of water at the time of application or by increasing the mercaptan content during polymerization to somewhat lower the molecular weight. Also, the coating operation can be carried out at reduced speed or a small proportion of organic solvent can be added to improve flow.

Stated more particularly, in this invention monoethylenically unsaturated monomers including a proportion of carboxyl-functional monomer providing water dispersibility with the aid of a base and a monoethylenically unsaturated monomer carrying a reactive group selected from dicarboxylic acid anhydride functionality and N-methylol functionality in small proportion of from 0.5–5% of the total weight of monomers, are copolymerized in solution in a water soluble polyol which comprises preferably an adduct of ethylene oxide with a bisphenol of the type taught in said Blank patent. This copolymerization is conducted under conditions causing extensive reaction between the dicarboxylic acid anhydride functionality or the N-methylol functionality in the reactive monomer and the hydroxy groups in the polyol.

The monoethylenically unsaturated monomers other than the anhydride functional monomer, the N-methylol functional monomer, and the carboxyl-functional monomer, can be termed "nonreactive" which denotes that they do not react under the conditions of polymerization and subsequent cure. This usually means the absence of any functional group other than the single polymerizable ethylenic group. These nonreactive monomers are illustrated by styrene, vinyl toluene, methyl methacrylate, $C_2$–$C_8$ alkyl acrylates and methacrylates, such as ethyl acrylate or butyl methacrylate. Vinyl acetate and acrylonitrile are also useful.

The carboxyl-functional monomer is subject to wide variation as is well known. About 5% to about 35%, preferably from about 7% to about 15% of carboxyl-functional monomer, based on the total weight of monomers, is appropriate for the desired water dispersibility with the aid of a base. Acrylic acid is a preferred carboxyl-functional monomer, but crotonic acid, itaconic acid, methacrylic acid and fumaric acid will further illustrate this well known class of monomers. The carboxyl group does not react with the polyol during copolymerization as is known.

The N-methylol functional monomers are preferred, and are typically illustrated by N-methylol acrylamide, N-methylol methacrylamide or N-methylol allyl carbamate, but these are just illustrative of this well known class. In preferred practice it is desired to liberate the N-methylol reactivity of the reactive monomer progressively as the polymerization reaction proceeds, and for this purpose an alcohol ether of the N-methylol monomer is used instead of the N-methylol monomer itself. Thus, $C_1$–$C_8$ alcohol ethers are useful, such as the ethyl, butyl or isobutyl ethers of acrylamide. Ether alcohols are also useful and are intended to be embraced by the language used above. Isobutoxymethyl acrylamide will be used as illustrative.

Any water soluble polyhydric alcohol having a molecular weight in excess of about 300 may be used such as polyethers and polyesters of polyhydric alcohol, such as ethylene glycol, propylene glycol, butylene glycol, glycerin, trimethylol propane, or pentaerythritol. Ethylene oxide or propylene oxide adducts having a molecular weight appropriate for water solubility may be used alone or in combination to regulate the functionality in the final cured coating.

The copolymerization reaction including the N-methylol functional monomer, or the prereaction of this monomer with the diol is preferably carried out at a temperature of about 125° C. to about 140° C. This is higher than the customary copolymerization temperature which does not usually exceed 120° C. The product of reaction (water or alcohol) is removed to drive the reaction with the N-methylol group to substantial completion.

It is important to note that partial reaction with excess reactive monomer is not a feasible alternative because there is no way to effectively limit the reaction.

Instead of an N-methylol functional monomer, one can use a monoethylenic dicarboxylic acid anhydride, like maleic anhydride or a maleic anhydride which is substituted by a halogen atom or a hydrocarbon group. The reaction of anhydride with diol takes place at ordinary polymerization temperature.

One can broadly use from 5–40% of total resin solids of aminoplast or phenoplast resin curing agent, water soluble and dispersible agents of this type being well known in the art and illustrated in the patents referred to herein. From 5–20% of such curing agents is preferred in this invention.

The proportion of polyol should be sufficient to dissolve the monomers and the product of copolymerization. Other organic solvents and especially water-miscible organic solvents, such as 2-ethoxy ethanol, can be added to minimize viscosity, but these are preferably absent or kept to less than 20% of the weight of the copolymer. The preferred proportion of polyol is from 75% to 25%, based on the weight of total monomers and the preferred proportions are from 100% to 200% on the same basis. Mixtures of triols or tetrols with a major weight proportion (more than 50%) of diol are particularly preferred.

As is well known, any volatile base may be employed to disperse the acidic copolymer in water, and these are usually ammonia or a volatile amine which will be illustrated herein by dimethyl ethanol amine.

It is noted in passing that the aqueous dispersions which are provided are either solutions or colloidal dispersions (not emulsions) and all proportions herein are by weight unless otherwise stated. Also, the aqueous dispersions include an aminoplast or phenoplast resin or mixture thereof as curing agent, (usually 5%–40% of total resin solids as is customary) and the cure is by baking which evaporates all volatile components and provides the elevated temperature necessary for cure.

The invention is illustrated in the following examples.

EXAMPLE 1

| Parts by Weight | Component |
|---|---|
| 1410 | Bisphenol A-ethylene oxide adduct [mol ratio 1:6] (The commercial product XD-8025.01 of American Cyanamid may be used). Charge the above, set empty trap, and heat to 130° C. |
| 515 | Styrene |
| 411 | Isobutyl acrylate |
| 21 | Isobutoxymethyl acrylamide |
| 110 | Acrylic acid |
| 32 | Benzoyl peroxide |
| 18.5 | t-Butyl mercaptan Premix the above and add over a 2½ hr. period at 130° C. Collect butanol. Hold an additional hour at 130° C. |
| 5 | t-Butyl perbenzoate Add perbenzoate and hold for 1 hour at 130° C. |
| 5 | t-butyl perbenzoate Add perbenzoate and hold for 1½ hours at 130° C. Cool to 80° C. |
| 155 | Dimethyl ethanol amine |
| 300 | Deionized water Add amine and water slowly over a 10 minute period. |
| 1800 | Deionized water Add water slowly over a 15 minute period to provide a product having the following characteristics: |
| | Solids (percent) 51.3 |
| | Viscosity 7000 centipoises |
| | Acid value (nonvolatiles) 36.6 |

EXAMPLE 2

| Parts by Weight | Component |
|---|---|
| 1410 | Bisphenol A-ethylene oxide adduct Mol ratio 1:6 (see Example 1) Charge the above, heat to 110° C. and set reflux condenser. |
| 515 | Styrene |
| 432 | Isobutyl acrylate |
| 110 | Acrylic acid |
| 32 | Benzoyl peroxide |
| 18.5 | t-Butyl mercaptan Premix the above components and add over a 2½ hour period at 110° C. After addition, hold for 1 hour at 110° C. |
| 5 | t-Butyl perbenzoate Add perbenzonate and hold 1 hour at 110° C. |
| 5 | t-Butyl perbenzoate Add perbenzoate and hold 1½ hours at 110° C. Then cool to 80° C. |
| 155 | Dimethyl ethanol amine |
| 300 | Deionized water Slowly add amine and water over a 10 minute period. |
| 1800 | Deionized water Slowly add water over a 15 minute period to provide a product having the following characteristics: |
| | Solids (percent) 51.5 |
| | Viscosity 5000 centipoises |
| | Acid value (nonvolatiles) 35.9 |

Comparing Example 1, which represents the present invention, with Example 2, which presents a control in which the N-methylol functional monomer is omitted, the viscosity in Example 1 is much higher than the viscosity in Example 2, indicating extensive coreaction between the N-methylol functionality and the hydroxy group in the bisphenol-based polyol. When the aqueous dispersions of Examples 1 and 2 are coated and cured by baking, the Example 1 product was harder, possessed greater impact resistance, and greater resistance to blushing when subjected to beer pasteurization testing. More particularly, the pencil hardness was improved from 1H in Example 2 to 3H in Example 1.

Example 2 can be varied by replacing 20 parts of the acrylic acid with 20 parts of maleic anhydride, everything else remaining the same. The product will exhibit a higher viscosity and will cure to greater hardness.

EXAMPLE 3

| Parts by Weight | Component |
|---|---|
| 365 | Propylene oxide adduct of trimethylol propane of molecular wt. 440 (Wyandotte polyol TP440 may be used |
| 885 | Bisphenol A-ethylene oxide adduct (mol ratio 1:6) - see Example 1 Heat to 120° C. |
| 365 | Styrene |
| 295 | Isobutyl acrylate |
| 78 | Acrylic acid |
| 15 | Isobutoxymethyl acrylamide |
| 26 | t-butyl perbenzoate |
| 20 | t-butyl mercaptan Premix the above and add to reactor over a 3 hour period while maintaining the temperature at 120–125° C. Hold for 1 hour |
| 3 | t-butyl perbenzoate - add and hold 1 hour. |
| 3 | t-butyl perbenzoate - add and hold 1 hour. cool to 70° C. |
| 97 | Dimethyl ethanol amine |
| 300 | Deionized water add amine and water over a 10 minute period. |
| 1200 | Deionized water - add over a 15 minute period to provide a product having the following characteristics: |
| | Solids (percent) 55.3 |
| | Viscosity 7000 centipoises |
| | Acid value (nonvolatiles) 30.3 |

EXAMPLE 4

| Parts by Weight | Component |
|---|---|
| 365 | Propylene oxide adduct of trimethylol propane of molecular wet. 440 - see Example 3 |
| 885 | Bisphenol A-ethylene oxide adduct (mol ratio 1:6) - see Example 1 Heat to 120° C. |
| 365 | Styrene |
| 310 | Isobutyl acrylate |
| 78 | Acrylic acid |
| 26 | t-butyl perbenzoate |
| 20 | t-butyl mercaptan Premix the above and add to reactor over a 3 hour period at 120° C.–125° C. Hold 1 hour. |
| 3 | t-butyl perbenzoate - add, hold 1 hour. and cool to 70° C. |
| 3 | t-butyl perbenzoate - add and hold 1 hour. |
| 97 | Dimethyl ethanol amine |
| 300 | Deionized water add over a 10 minute period. |
| 1200 | Deionized water. - add over a 15 minute period to provide a product having the following characteristics: |
| | Solids (percent) 55.1 |
| | Viscosity 3500 centipoises |
| | Acid value (nonvolatiles) 30.5 |

EVALUATION OF COPOLYMERS OF EXAMPLE 3 AND 4 IN COATING COMPOSITIONS

Pigmented coating compositions were prepared from the copolymer products of Examples 3 and 4 using a pigment (R-960 titanium dioxide pigment from duPont) to binder ratio of 0.9:1.0. The pigment is simply ground into the water solutions of Examples 3 and 4. The coatings were applied on both aluminum and tin plate substrates, and the films were cured using 25% of hexamethoxymethyl melamine resin which is added to the pigmented solutions with simple stirring. Baking is for 20 minutes at 350° F. The following properties were obtained.

| | Example 3 | | Example 4 | |
|---|---|---|---|---|
| | Aluminum | Tin Plate | Aluminum | Tin Plate |
| Wetting of Surface | 7.0 | 7.0 | 5.0 | 5.0 |
| Pencil hardness | 2H | 2H | 2H | F–H |
| Gloss (60° glossmeter) | 89% | 85% | 81% | 84% |
| Methyl ethyl ketone resistance | 80 | 100+ | 18 | 65 |
| Beer Pasteurization | 8.5/9.0 | 8.5/8.5 | 10/10 | 8/8 |
| Detergent Resistance | 7.0/9.0 | 3.0/9.5 | 10/10 | 0/8 |
| Mobility Test Jonwood Angle | 10.5 | 9.0 | 14.5 | 12 |
| Ink Acceptance | 10 | 10 | 9 | 7 |
| Adhesion | 10 | 10 | 9 | 9 |

In the mobility test, the lower number is the better value, indicating less friction and, hence, greater mobility. In all of the other tests, the higher number represents the better value on a scale of 0–10 in which 10 is perfect, except for the solvent resistance where the number of double rubs with a ketone-saturated cloth required to remove the coating is reported.

As will be seen, the Example 3 product, containing the functional monomer (isobutoxymethyl acrylamide) exhibited far superior properties in comparison with the Example 4 control which contained no functional monomer. In the comparison on aluminum, the Example 4 product exhibited significantly reduced gloss, and lowered methyl ethyl ketone resistance as well as poor mobility which results in rapidly moving cans being marred by frictional engagement with the transporting elements in the canning equipment. Thus, these factors eliminate the Example 4 product, even though the pasteurization and detergent resistance were very good. On tin plate the product of Example 3 was superior throughout.

Examples 1 and 3 can be modified by prereacting the isobutoxymethyl acrylamide with the bisphenol A-ethylene oxide adduct, and then the same procedure can be used with the exception that butanol would not be collected because it would have been removed during the prereaction. Also, in this modification of Examples 1 and 3, the polymerization can be carried out at a somewhat lowered temperature, e.g., at 110° C. as in Example 2. Further, and in this modification on Examples 1 and 3, N-methylol acrylamide may be used, and water collected instead of butanol.

The invention is defined in the claims which follow. We claim:

1. An aqueous coating composition comprising a water dispersible copolymer solution in water soluble polyol with controlled limited reaction between the copolymer and the polyol produced by copolymerizing monoethylenically unsaturated monomers including a proportion of carboxyl functional monomer providing dispersibility in water with the aid of a base and from 0.5%–5%, based on the total weight of monmers, of a monoethylenically unsaturated monomer carrying a reactive group selected from dicarboxylic acid anhydride functionality and N-methylol functionality, in solution in a water soluble polyol having a molecular weight of at least about 300, the copolymerization being carried out or being preceded by conditions causing substantially complete reaction between the said anhydride or N-methylol functionality in the reactive monomer and the hydroxy groups in the polyol, said copolymer solution being dispersed in water with the aid of a volatile base.

2. An aqueous coating composition as recited in claim 1 in which said carboxyl-funtional monomer is present in an amount of about 5% to about 35% of total monomers, and said polyol contains a major weight proportion of diol.

3. An aqueous coating composition as recited in claim 2 in which said reactive monomer carries N-methylol functionality.

4. An aqueous coating composition as recited in claim 1 in which said composition further includes an aminoplast or phenoplast curing agent.

* * * * *